R. D'Heureuse,
Picture Hanger.
No. 90,998. Patented June 8, 1869.
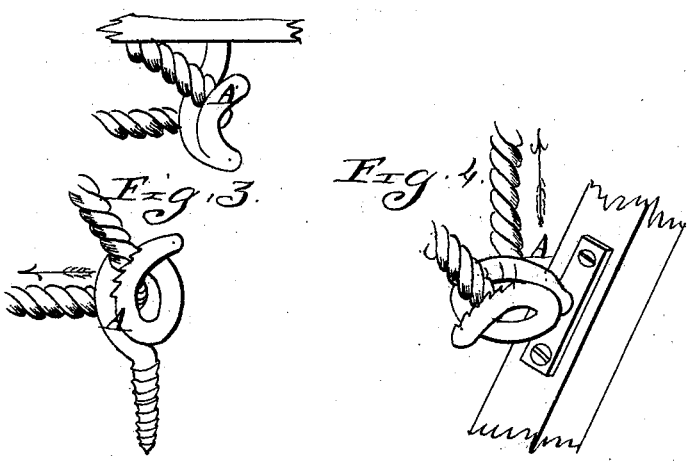
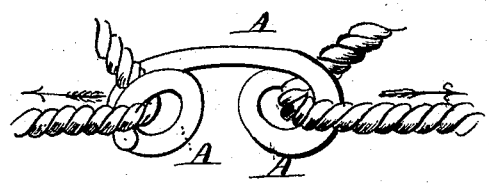
Witnesses:
Gustave Dieterich
Oscar Hinchman
Inventor
R. d'Heureuse
per Munn & Co.
Att'ys

United States Patent Office.

R. D'HEUREUSE, OF NEW YORK, N. Y.

Letters Patent No. 90,998, dated June 8, 1869.

---

IMPROVED CORD-HOLDER FOR PICTURE-FRAMES, &c.

---

The Schedule referred to in these Letters Patent and making part of the same.

---

*To all whom it may concern:*

Be it known that I, R. D'HEUREUSE, of New York, in the county and State of New York, have invented a new and improved Cord-Attachment or Holder; and I do hereby declare that the following is a full, clear, and exact description thereof, which will enable others skilled in the art to make and use the same, reference being had to the accompanying drawings, forming part of this specification, in which—

Figures 1, 2, 3, 4, and 5, represent different forms or styles of my improved holder.

Similar letters of reference indicate corresponding parts.

My invention has for its object to furnish an improved attachment or holder for cords for hanging pictures, mirrors, and for other purposes, which shall be so constructed and arranged that the cord may be conveniently arranged and securely held in any position into which it may be adjusted; and It consists in the attachment or holder, constructed in such a way that the cord may be passed around a rod, and turned into an angle formed in or by said rod, so as to securely hold the said cord, as hereinafter more fully described.

A, in the drawing, represents the rod, the size of which should depend upon the weight of the picture or other object to be suspended, or the strain to be resisted.

The rod A is turned back upon itself so as to form an acute angle, as shown in fig. 1, into which the cord is drawn after being passed around the said rod, as shown in red; or the rod may be bent so as to form an eye, the projecting end of said rod standing out to form an acute angle, as shown in figs. 3 and 4, or bent in, as shown in fig. 2. In the case shown in figs. 3 and 4, the end of the cord is passed through the eye, and is then drawn into the said angle, as shown in red; or the rod A may be bent back upon itself in such a way as to form two or more angles, as shown in fig. 5, to give the holder a firmer hold upon the cord. When the attachment is used for connecting and holding the two ends of a cord, or the adjacent ends of several cords, or to take up the slack or adjust the tautness of the cord, the whole device may be multiplied to suit the purpose, as shown in fig. 6.

The end of the rod A may be secured in any convenient manner to the object to be attached to the cord.

The sides of the rod that form the angle to receive the cord may be corrugated or roughened, if desired, to give them a firmer hold upon the cord.

Having thus described my invention,

What I claim as new, and desire to secure by Letters Patent, is—

1. An improved cord-attachment or holder, formed by bending a rod upon itself, so as to form an acute angle or angles to receive and hold the cord or cords after passing around said rod, substantially as herein shown and described, and for the purposes set forth.

2. An improved cord-attachment or holder, formed by bending a rod upon itself, so as to form an acute angle or angles, the sides forming the angles being corrugated or roughened to receive and hold the cord or cords after passing around said rod, substantially as herein described and shown.

The above specification of my invention, signed by me, this 23d day of March, 1869.

R. D'HEUREUSE.

Witnesses:
FRANK BLOCKLEY,
JAMES T. GRAHAM.